United States Patent [19]

Rehbein

[11] 4,429,526

[45] Feb. 7, 1984

[54] SUSPENSION CHAIN HEAD FOR MECHANICALLY ASSEMBLED SLING CHAIN SYSTEMS

[75] Inventor: Friedhelm Rehbein, Menden-Oesbern, Fed. Rep. of Germany

[73] Assignee: Firma August Thiele, Iserlohn-Kalthof, Fed. Rep. of Germany

[21] Appl. No.: 331,127

[22] Filed: Dec. 10, 1981

[30] Foreign Application Priority Data

Dec. 23, 1980 [DE] Fed. Rep. of Germany ....... 3048863

[51] Int. Cl.³ .............................................. F16G 15/04
[52] U.S. Cl. ..................................... 59/93; 294/78 R
[58] Field of Search ................... 59/93, 85, 86, 78, 84, 59/88; 294/82 R, 78 R

[56] References Cited

U.S. PATENT DOCUMENTS

| 1,974,827 | 9/1934 | Lutts | 59/84 |
| 4,094,141 | 6/1978 | Rehbein | 59/93 |
| 4,149,369 | 4/1979 | Smetz | 294/82 R |
| 4,182,116 | 1/1980 | Clement | 59/93 |

FOREIGN PATENT DOCUMENTS 130344 12/1950 Sweden ................................. 59/86

Primary Examiner—Gene Crosby
Attorney, Agent, or Firm—Michael J. Striker

[57] ABSTRACT

A suspension chain head for mechanically assembled sling chain systems is proposed. The suspension head has a U-shaped suspension member with two legs and a web provided with a central portion and two lateral fork portions. A connecting member is pivotally mounted on the web of the suspension member and has two legs received in slots of the web and a bracket connecting the legs with one another, wherein the connecting member has a receiving opening with a width corresponding to the thickness of the chains to be suspended. The central portion of the web of the suspension member has a thickness at most equal to the thickness of the chains to be suspended, and the forked portions of the web of the suspension member have at least the thickness of the central portion of the web.

13 Claims, 11 Drawing Figures

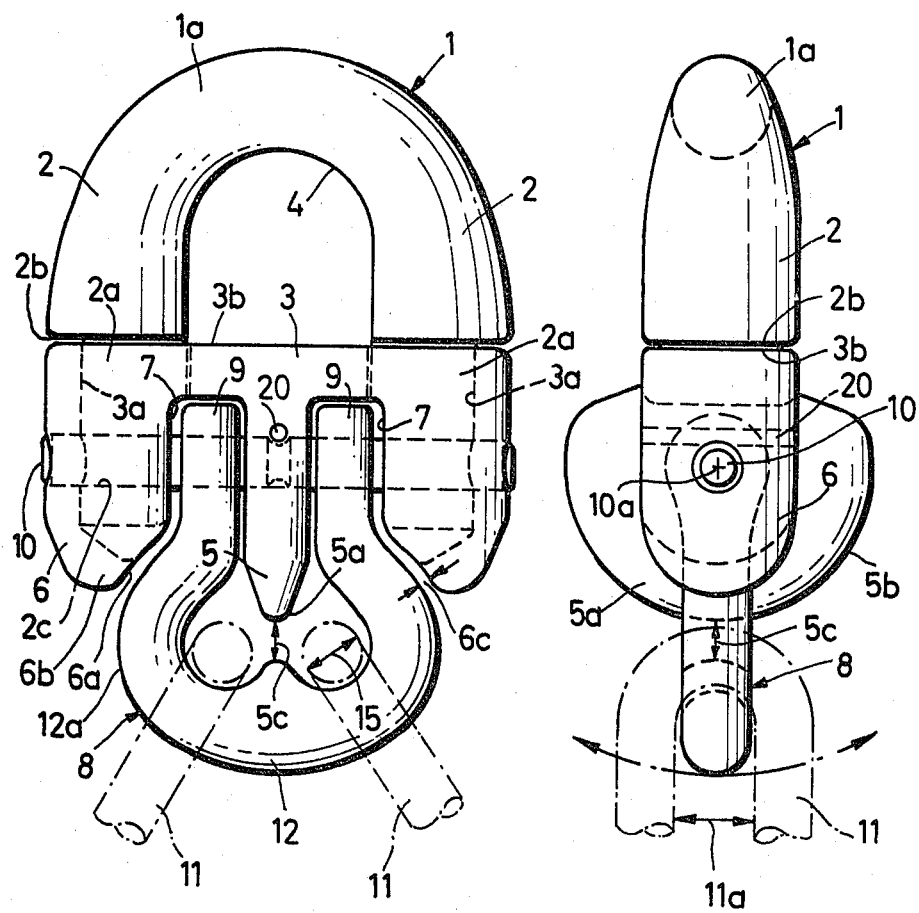

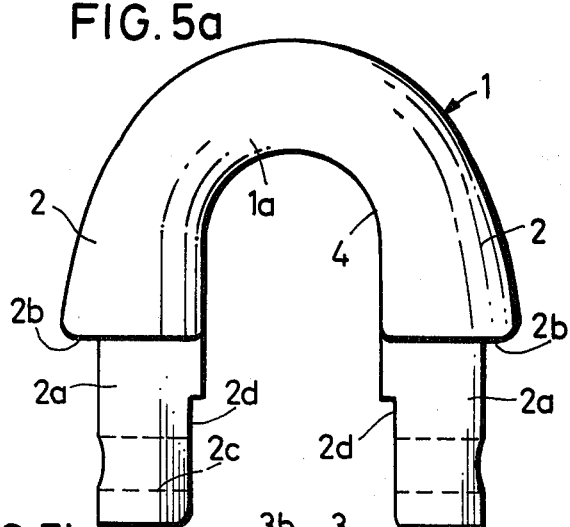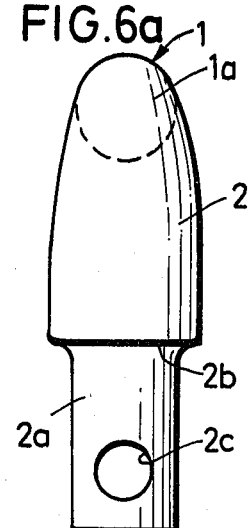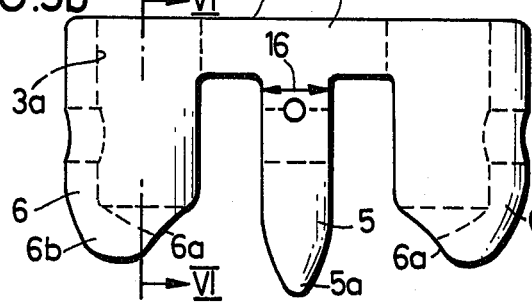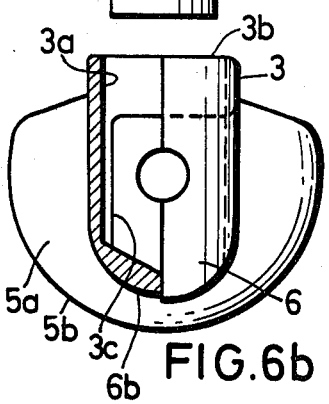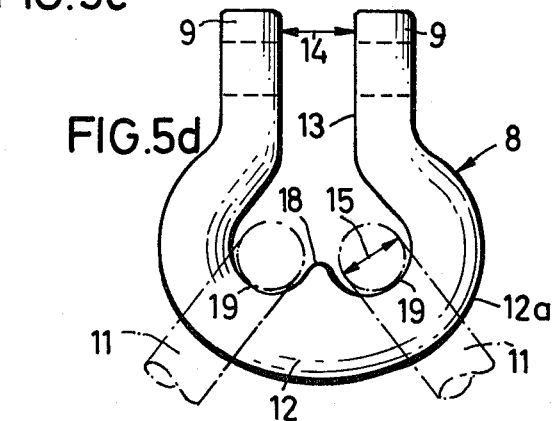

SUSPENSION CHAIN HEAD FOR MECHANICALLY ASSEMBLED SLING CHAIN SYSTEMS

BACKGROUND OF THE INVENTION

The present invention relates to a suspension chain head for mechanically assembled sling chain systems, including a suspension member and a connecting member pivotally connected with the suspension member and arranged to hold chains.

Suspension chain heads of this general type are known in the art. A known suspension chain head for mechanically assembled round steel chains has a substantially U-shaped connecting member or shackle. The legs of the connecting member has a relatively great distance therebetween and engage in respective slots in an ear part of a suspension member at both sides of a correspondingly wide central portion. The lateral fork portions of the suspension member are formed relatively weak. The round steel chains pulled around the connecting member must extend in a predetermined application with a spread angle of maximum 120° from the suspension member. For preventing erroneous utilization of such a suspension chain head, the legs and the bracket portion of the U-shaped connecting member are so dimensioned that it is impossible to suspend weaker round steel chains whose link openings have a smaller inner width than the cross section of the bracket. Moreover, a plug with the permissible loading data is provided on the suspension chain head. This, however, does not prevent a user from suspending on the bracket of the connecting member either stronger round steel chains when they have a sufficient inner width, or despite the permissible number of one or two chains to mount three or more chains on the connecting member. This is also true for a known suspension chain head for sling chains, in which the connecting member is substantially omega-shaped.

In addition, in both known suspension chain heads there is a possibility that they can be used, contrary to their predetermined utilization, as a chain connecting element, so that the bracket of the connecting member in extended position of the suspended round steel chains is loaded transverse to its longitudinal axis of symmetry on both its legs so strongly by pulling and bending forces that the ears of the connecting member are pressed against the lateral forked portions of the suspension member and bent outwardly. Also, bending and shearing forces act upon the pivot pin in an unacceptable manner.

SUMMARY OF THE INVENTION

Accordingly, it is an object of the present invention to provide a suspension chain head which avoids the disadvantages of the prior art.

More particularly, it is an object of the present invention to provide a suspension chain head for mechanically assembled sling chain systems, which is formed so that it accurately holds the mechanically assembled system and can be used only with chains of a predetermined thickness.

It is another object of the present invention to provide a suspension chain head for mechanically assembled sling chain systems, in which the number of chains to be used is limited to a maximum predetermined chain number for the particular suspension chain head.

Still another object of the present invention is to provide a suspension chain head for mechanically assembled sling chain systems, in which it is guaranteed that, even in the event of erroneous utilization of the suspension chain head, the connecting member for receiving the round steel chain is not bent outwardly and the lateral forked portions and the pivot pin extending therethrough reliably withstand the applied load.

In keeping with these objects, and with others which will become apparent hereinafter, one feature of the present invention resides, briefly stated, in a suspension chain head for mechanically assembled spring chain systems, having a U-shaped suspension member with two legs and a web with a central portion and two lateral forked portions forming two parallel slots therebetween, and a connecting element pivotally mounted on the web and having two legs received in the slots and a bracket connecting the legs with one another, wherein the width of a receiving opening of the connecting member corresponds to the thickness of the chains to be suspended, the thickness of the central portion of the web of the suspension member is equal to or insignificantly greater than the thickness of the chains to be suspended, and the thickness of the forked portions of the web of the suspension member is at least equal to the thickness of the central portion of the web of the suspension member.

Since the width of the receiving openings of the connecting member corresponds to the predetermined or rated thickness of the round steel chains to be suspended, it is guaranteed that the round steel chains with a greater thickness cannot be suspended in the connecting member. Moreover, it is possible to have the central portion of the web of the suspension member, located between the legs of the connecting member, relatively small, and instead to form the lateral forked portions of the suspension member so strong that they have at least the thickness of the central portion of the web. Thereby they are in a position such that when an erroneous utilization of the suspension chain head takes place, for example at a chain connecting member, they can take up the loads, and the suspension chain head need not be more shapeless and heavy, whereby a simple and reliable handling takes place in practice.

In accordance with another advantageous feature of the present invention, the suspension member may be formed as a two-piece member including a bracket part and the above mentioned web part connected with one another by a plug-socket connection.

A further feature of the present invention is that the central portion of the web of the suspension member has a projection extending toward the bracket of the connecting member and spaced from the latter by a distance which is smaller than the thickness of the chains to be suspended. The projection of the central portion extends transversely to a pivot pin connecting the suspension member with the connecting member and at both sides of the suspension member substantially along a circular arc with a center on the longitudinal axis of the pivot pin. The projection has such a radial circumference that a radial distance between the latter and the bracket of the connecting member remains identical in the entire pivoting region of the connecting member. The projection of the central portion may be nose-shaped. When the suspension chain head is designed in accordance with this feature, an unobjectionable separation of both round steel chains suspended on the connecting member takes place not only in the extended hanging position, but also in all deviating positions over the entire pivoting region of the connecting member of approximately 180°, or even more.

Still a further feature of the present invention resides in the fact that the connecting member has a cam arranged opposite to the projection and forming in the bracket of the connecting member two separate pockets for suspending the chains. When this feature is utilized, the separation of the chain strands is further improved.

The forked portions of the web of the suspension member may have end sections extending at both sides beyond the legs of the connecting member and transiting into wedgeshaped tongues at identical distances from the outer surfaces of the bracket of the connecting member. When the suspension chain head is designed in accordance with this feature, it provides an especially easy to handle construction, and in addition provides for support of the legs and the connecting member under extreme loading in improved manner.

When the bracket part and the web part of the suspension member are formed as separate members, the web may be provided with pocket holes, and the bracket part may be provided with parallel pins insertable into the pocket holes and having through openings. A pivot pin may extend through the legs of the connecting member and the through openings so as to connect the pins of the bracket part with the web of the suspension member. This construction guarantees a particularly favorable manufacturing and utilization of the suspension chain head. The connecting member and the web of the suspension member are manufactured as separate members and connected with one another without welding or other fixed connection, so that they can be released from one another at any time. This is particularly advantageous for the utilization of the suspension chain head with matching closed suspending ears in the mechanically assembled system, so that all utilized parts before the assembly can be hardened as required and in correspondence with respective practice without losing strength because of reduction of initial hardness as a result of welding connections.

The pocket holes of the webs may have lateral cutouts formed so that the pins of the bracket part of the suspension member are located immediately adjacent to the legs of the connecting member. Thereby the pins of the suspension member perform the functions of bearings for the connecting member.

The pins of the bracket part of the suspension member may be provided with flattened sections at both sides of the legs of the connecting member. In such a construction, the abutment of the legs of the connecting member against the pins is further improved.

Still another feature of the present invention is that the pins of the bracket part of the suspension member have steps at the height of an upper edge of the web of the suspension member. This allows an unobjectionable axial fixation of the bracket part of the suspension member relative to the web part thereof.

Finally, the bracket part of the suspension member may have an upper suspending region with a cross section of a thickness corresponding to the mouth width of a load hook for the head. This allows an unobjectionable utilization of the suspension chain head in connection with the respective load hooks in mechanically assembled systems.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a view substantially corresponding to the view of FIG. 1, but showing a suspension chain head in accordance with another embodiment of the invention;

FIG. 4 is a lateral view of the suspension chain head of FIG. 3;

FIGS. 5a–5d are front views of parts of the suspension chain head of FIGS. 3 and 4;

FIGS. 6a and 6b are lateral views of the parts of FIGS. 5a–5d, wherein FIG. 6b is a view showing a section taken along the line 6—6 in FIG. 5b.

DESCRIPTION OF THE PREFERRED EMBODIMENTS

A suspension chain head for mechanically assembled sling chain systems has a substantially U-shaped suspension member 1 with two legs 2 which are connected with one another by a web 3 and define a suspension member opening 4.

Figures 1, 2:
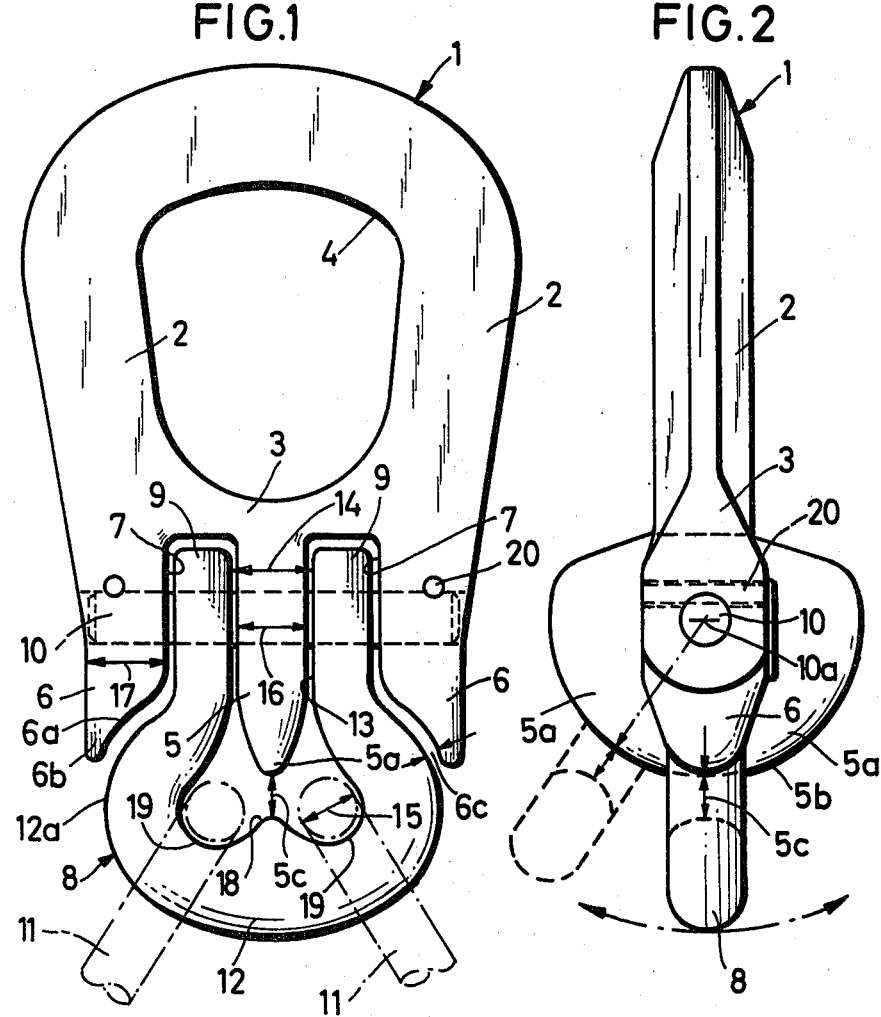
FIG. 1 is a front view of a suspension chain head in accordance with the present invention.
FIG. 2 is a lateral view of the suspension chain head of FIG. 1 with a connecting member shown in an additional pivoted position.

In the embodiment shown in FIGS. 1 and 2, the U-shaped suspension member 1 is of one piece with the web 3 and produced by forging. A central portion 5 and two lateral forked portions 6 extend downwardly from the web 3 at opposite sides of the opening 4. The forked portions 6 are mirror-symmetrical relative to the central portion 5 and define with the latter two parallel slots 7.

The suspension chain head has further a connecting member 8 provided with two legs 9 arranged to be received in the above mentioned parallel slots 7. The connecting member 8 is pivotally connected with the web 3 of the suspension member 1 by a pivot pin 10 arranged in the plane of the opening 4. The connecting member 8 serves for receiving for example two round steel chains 11 of predetermined or standard thickness.

As can be seen from FIGS. 1 and 2, both legs 9 of the connecting member 8 extend parallel to one another and inwardly relative to a bracket 12 of the connecting member 8 so that the bracket 12 has substantially the shape of an ellipse with a lateral inlet opening 13 for the round steel chains 11. The inlet opening 13 has a width 14 which is dimensioned in correspondence with the predetermined thickness 15 of the round steel chains with a respective surplus. The bracket 12 of the connecting member 8 is thereby substantially omega-shaped, and both legs 9 and the cross section of the bracket 12 are so dimensioned that it is impossible to hang on the connecting member round steel chains which are weaker than those intended for the particular mechanically assembled system. Referring to FIG. 4, it may be seen that a link of the round steel chain 11 has an inner width 11a corresponding to the dimension of the legs 9 and the bracket 12.

The central portion 5 of the web of the suspension member 1 has a thickness 16 which is substantially equal to the predetermined thickness 15 of the round steel chains 11 to be suspended or insignificantly greater than the same, and as far as it is allowed by the width 14 of the inlet openings 13. Both lateral forked portions 6 have a thickness 17 which is at least equal to the thickness of the central portion 5, but can be substantially thicker.

For an unobjectionable separation of the end links of the round steel chain 11 suspended in the connecting member 8, the central portion 5 of the web of the suspension member 1 is provided with a nose-shaped projection 5a. The projection 5a extends so deep between the legs 9 and transverse to the pivot pin 10 at both sides of the suspension member that it extends over a circular arc with a center on a longitudinal axis 10a of the pivot pin 10. The projection 5a has such a radial outer circumference 5b that a radial distance 5c from the bracket 12 of the connecting member 8 remains unchanged in the entire pivoting region of the connecting member 8 and smaller than the predetermined thickness 15 of the round steel chains 11.

A cam 18 is formed on the bracket 12 of the connecting member 8 at a location corresponding to the central portion 5 of the web 3 of the suspension member 1. The cam 18 defines two suspending pockets 19 which are separated from one another and arranged for receiving the round steel chains 11.

Handling and thereby serviceability of the suspension chain head is further improved when an inner contour 6a of the lateral forked portions 6 corresponds to an outer contour 12a of the connecting member 8. More particularly, this correspondence is established in such a manner that end sections 6b of the forked portions 6 of the suspension member 1 extend at both sides beyond the legs 9 of the connecting member 8 toward the bracket 12. The end sections 6b are spaced at an identical and continuous thickness 6c from the outer surface 12a of the bracket 12 and form wedge-shaped tongues.

A suspension chain head in accordance with a second embodiment of the present invention, shown in FIGS. 3–6b, also has the suspension member 1 which is, however, not a one-piece member. The suspension member 1 has a bracket part 1a which is connected with the web 3. More particularly, the legs 2 of the suspension member 1 of this embodiment have two parallel pins 2a engaging in a respectively dimensioned pocket hole 3a in the web 3. The pins 2a are stepped on both legs 2, at a location 2b at the side of an upper edge 3b of the web 3. Thereby the bracket 1a is supported on the web 3. The web 3 in this embodiment is formed substantially as a clasp and is connected with the bracket part 1a by the pivot pin 10 which extends through the web 3, the legs 9 of the connecting member 8 and respective openings 2c in both pins 2a of the bracket 1a.

The web 3 as well as both tongues 2a and both legs 9, are provided with a row of coaxial openings through which the pivot pin 10 extends. The latter is retained in its position by a spring cotter 20 and non-detachably connects the respective individual parts of the suspension chain head with one another.

An especially reliable and firm, and thereby durable, connection of the connecting member 8 with the web 3 is attained when the pocket holes 3a are provided with lateral cut-outs 3c to both legs 9 of the connecting member 8, so that they lie in the pins 2a engageable in the web 3 immediately adjacent to the legs 9. The pins 2a have at both sides of the legs 9 flattenings 2d which support the legs of the connecting member 8 against bending by one another.

Figure 7:
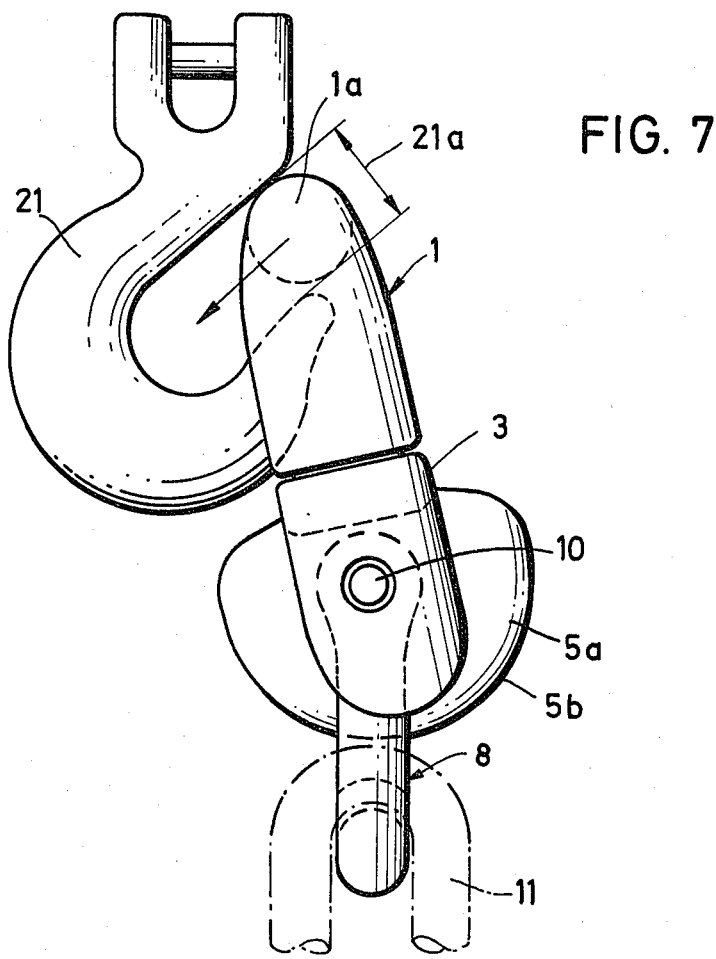
FIG. 7 is a view showing the inventive suspension chain head in connection with a load hook.

As can be seen from FIG. 7, the suspension member 1 of the suspension chain head has an upper suspending region 1a with a transverse thickness dimensioned in accordance with a mouth width 21a of a load hook 21 corresponding to the mechanically assembled system. This is true for both embodiments of the present invention.

It will be understood that each of the elements described above, or two or more together, may also find a useful application in other types of constructions differing from the types described above.

While the invention has been illustrated and described as embodied in a suspension chain head for mechanically assembled sling chain systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A suspension chain head for mechanically assembled sling chain systems, comprising a substantially U-shaped suspension member having two legs and a web having a central portion and two lateral fork portions arranged mirrorsymmetrical at opposite sides of said central portion so as to form two parallel slots therebetween; and a connecting member pivotably mounted on said web of said suspension member and arranged for receiving chains of a predetermined thickness, said connecting member having two legs received in said slots of said suspension member and a bracket connecting said legs of said connecting member with one another, said legs and said bracket of said connecting members being dimensioned corresponding to an inner width of a link of the chains to be suspended, said legs of said connecting member extending parallel to one another and inwardly so that said bracket is omega-shaped, said connecting member having a receiving opening having a width greater than the thickness of the chains to be suspended, said central portion of said web of said suspension member having a thickness at most equal to the thickness of the chains to be suspended, and said fork portions of said web of said suspension member having at least the thickness of said central portion of said web of said suspension member.

2. A suspension chain head as defined in claim 1; and further comprising a pivot pin pivotally mounting said connecting member on said suspension member.

3. A suspension chain head as defined in claim 1, wherein the thickness of said central portion of said web of said suspension member is insignificantly greater than the thickness of the chains.

4. A suspension chain head as defined in claim 1, wherein said central portion of said web of said suspension member has a projection extending toward said bracket of said connecting member and spaced from the latter by a distance which is smaller than the thickness of the chains to be suspended.

5. A suspension chain head as defined in claim 1; and further comprising a pivot pin pivotally mounting said connecting member on said suspension member and having a longitudinal axis, a projection of said central portion extending transversely to said pivot pin at both sides of said suspension member substantially along a circular arc with a center on said longitudinal axis of said pivot pin, said projection having such a radial circumference that a radial distance between the latter and said bracket of said connecting member remains identical in the entire pivoting region of said connecting member.

6. A suspension chain head as defined in claim 4, wherein said projection of said central portion of said web of said suspension member is nose-shaped.

7. A suspension chain head as defined in claim 4, wherein said connecting member has a cam arranged opposite to said projection and forming in said bracket of said connecting member two separate pockets for suspending the chains.

8. A suspension chain head as defined in claim 1, wherein said bracket of said connecting member has an outer surface, said fork portions of said web of said suspension member having end sections extending at both sides beyond said legs of said connecting member and transiting into wedge-shaped tongues at identical distances from said outer surface of said bracket of said connecting member.

9. A suspension chain head as defined in claim 1, wherein said suspension member has a bracket part which is separate from and connected with said web, said web having pocket holes and said bracket part having parallel pins insertable into said pocket holes and having through openings; and further comprising a pivot pin extending through said legs of said connecting member and said through openings so as to connect said pins of said bracket part with said web of said suspension member.

10. A suspension chain head as defined in claim 9, wherein said pocket holes in said web have lateral cutouts to both said legs of said connecting member, said cutouts being formed so that said pins of said bracket part of said suspension member are located immediately adjacent to said legs of said connecting member.

11. A suspension chain head as defined in claim 9, wherein said pins of said bracket part of said suspension member are provided with flattened sections at both sides of said legs of said connecting member.

12. A suspension chain head as defined in claim 9, wherein said web of said suspension member has an upper edge at a predetermined height, said pins of said bracket part of said suspension member having steps at the height of said upper edge of said web.

13. A suspension chain head as defined in claim 1, wherein said suspension member is to be suspended on a load hook having a predetermined mouth width, said suspension member having a bracket part with an upper suspending region which has a cross section of a thickness corresponding to the mouth width of the load hook.

* * * * *